United States Patent [19]

Tugwell

[11] 4,037,008

[45] July 19, 1977

[54] TRANSFER PRINTING PROCESS AND ARTICLE

[75] Inventor: Dennis H. Tugwell, Anaheim, Calif.

[73] Assignee: Photo-Lith International, Stanton, Calif.

[21] Appl. No.: 240,371

[22] Filed: Apr. 3, 1972

Related U.S. Application Data

[63] Continuation-in-part of Ser. No. 143,914, May 17, 1971, abandoned.

[51] Int. Cl.[2] .......................... B32B 3/00; B44C 1/16; D06Q 1/00

[52] U.S. Cl. .................................... 428/200; 8/2.5 R; 101/470; 101/473; 427/148; 428/201; 428/202; 428/211; 428/349; 428/354; 428/355; 428/487; 428/488; 428/447; 428/452; 428/514; 428/914; 156/230; 156/240; 156/249

[58] Field of Search ................... 161/6, 406, 408, 413, 161/167, 256; 117/3.1, 3.2, 3.4, 36.4; 156/230, 240, 249; 101/470, 473; 8/2.5 R; 427/148; 428/914, 200, 201, 202, 211, 349, 354, 355, 514, 488

[56] References Cited

U.S. PATENT DOCUMENTS

| | | | |
|---|---|---|---|
| 2,159,693 | 5/1939 | Gaylord | 117/3.4 |
| 2,556,078 | 6/1951 | Francis | 161/406 T |
| 3,344,012 | 9/1967 | Ström | 156/240 |
| 3,359,127 | 12/1967 | Meyer | 161/406 |
| 3,511,732 | 5/1970 | Brookfield | 156/230 |
| 3,567,571 | 3/1971 | Martinovich | 156/240 |

*Primary Examiner*—Ellis Robinson

*Attorney, Agent, or Firm*—Knobbe, Martens, Olson, Hubbard & Bear

[57] ABSTRACT

The first layer of elastomeric synthetic resin transparent ink is screened onto a transfer sheet and is fused. One or more layers of compatible ink are deposited thereon and dried to form an image. Next, an elastomeric adhesive protective layer is applied and fused. The intermediate article thus produced by this process is a transfer sheet carrying a transfer lamination which is applicable to fabric. The adhesive layer is applied against the fabric with pressure, and the entire structure is heated. During this heating, the elastomeric adhesive is absorbed into the fabric and is cured in place to become thermoplastic. At the same time, the first layer against the transfer sheet becomes plastic and the transfer sheet is removed.

In another embodiment, the first and protective layers are fused and an additional elastomeric adhesive layer is applied unfused. During the transfer with the application of heat and pressure, the final layer performs the adhesive function, is absorbed into the fabric, and fuses.

9 Claims, 8 Drawing Figures

TRANSFER PRINTING PROCESS AND ARTICLE

CROSS-REFERENCE

This application is a continuation-in-part of patent application Ser. No. 143,914, filed May 17, 1971 by Dennis H. Tugwell, entitled "Transfer Printing Process and Article" now abandoned.

BACKGROUND OF THE INVENTION

1. Field of the Invention

This invention is directed to a transfer printing process and article wherein image-carrying ink is sandwiched between elastomeric thermally setting synthetic resin ink, the bottom layer of which is adhesively applicable to a stretchable fabric.

2. Description of the Prior Art

As discussed below, the usual printing methods are not well suited to directly applying an image onto a fabric, and particularly a stretchable fabric. The two basic printing methods used to transfer an ink to organize a permanent image are: surface-to-surface transfer of the ink, and application through a stencil. Several photographic or electrostatic printing processes are also known, but are not economically feasible to apply an image to a stretchable fabric in mass quantities.

Surface-to-surface printing methods include letterpress, rotary press, intaglio or gravure, web-fed offset and sheet-fed offset. Hectograph and ditto processes also fall under this category, but will not be discussed for image application to a fabric.

Letterpress utilizes a raised surface impression and is limited to single sheet feed. The material being printed must have reasonable linear rigidity to allow proper feed, whereas textiles do not normally have this linear rigidity. Rotary press utilizes raised surface impression as with letterpress, but has the advantage of high speed continuous roll feed. The material being printed must also have reasonable linear rigidity, and must have a fairly smooth and even surface not normally found with textiles. By substituting a rubber printing plate for the normal metal plates of the rotary or letter press, somewhat irregular surfaces such as corrugated cardboard can be printed. However, due to the elasticity of the rubber plate, fine half-tone screens or close color registration is impractical.

Web-fed and sheet fed offset processes are a high speed adaption of the lithographic process and utilize the principal that oil or grease based inks will not mix with water. By photo-chemically treating a thin metal or paper sheet, certain positions of the plate form an affinity with water, preventing an ink deposit, while other portions are left free to transfer ink. This process does not require a raised impression and proves most economical for full color or monochromatic fine halftone printing. Again, the offset process requires linear rigidity, and in particular, a smooth surfaced material for printing. Gravure utilized a recessed, intaglio, image surface.

The most important factor in the surface-to-surface ink transfer process in that all surfaces being printed must come in direct pressure contact with the printing plate surface. Also, the maximum deposit of ink possible in these processes is measured in a few (1 to 5) microns thickness. Gravure methods can deposit heavier layers of ink, and have been used by some textile printers to print fabrics. However, the ink transfered cannot be controlled closely enough to allow full color or fine monochrome halftones. The high cost of gravure printing plates has caused many textile printers to abandon this method for textile printing.

The stencil printing method has the advantage of depositing heavy layers of ink on smooth or rough surfaces at low stencil costs. The rigidity or flexibility of the material being printed is unimportant, as it normally does not move during the printing process. Common stencil printing is achieved by the open mask stencil, or by silk-screen, serigraphic, process. The mimeograph process also falls in this category, but is impractical for textile type applications.

Of the stencil printing processes, silk-screen printing is the most versatile for textile or similar applications. This process employs a fine mesh silk or other synthetic fiber stretched tightly over a rigid frame. A mask of gelatin, varnish or similar material is adhered to the silk screen, with the print pattern cut out to allow passage of ink to the material being printed.

The silk-screen material is available in several meshes to accommodate various needs. The finer the screen mesh, the finer the detail which can be achieved. Fine mesh screens require thinner ink viscosity and consequently deposit thinner layers of ink. Coarse mesh screens will allow heavy deposits of more viscous inks, but do not allow fine detail.

By photosensitizing the gelatin or other masking material, a halftone reproduction can be achieved. However, the halftone screen mesh and the actual silk-screen mesh are conflicting, and fine definition of the halftone is not possible. It is generally considered by silk-screen printers that under optimum conditions and skills, the maximum halftone screen practical is 65 to 80 line. This requires the use of the finest silk-screen mesh available and exceptional skills by the screenprint operator. Thus, very fine monochromatic halftones are impractical. In addition, in multicolor work precise registration is necessary for full color printing. Furthermore, precise deposits of ink are necessary for full color printing to make full color silk-screen printing impractical.

The silk-screen process has been chosen by most in the textile printing industry to enable a heavy deposit of ink which will be absorbed deep into the fibers, creating a solid color image, at low screen-print costs. Multiple solid color printing with reasonable accuracy in registration is accomplished by placing the fabric on a stationary surface, and then applying several different solid colors with the use of as many different silk screens. During this process, the fabric is not normally moved or repositioned on the stationary printing surface.

With regard to inks, the most recent advances in silk-screen process printing of fabrics has been the advent of thermal stretch ink which is thermally setting plastisol. In these inks, vinyl polymer is dispersed in plasticiser and optional polar solvent. Pigments can be mixed in the polymer and plasticiser and are thermally set by the application of heat to form a thermoplastic ink which remains resilient, but has a sufficiently high softening temperature that it can normally withstand maximum wash temperatures without changes in the ink characteristics.

SUMMARY OF THE INVENTION

In order to aid in the understanding of this invention, it can be stated in essentially summary form that it is directed to a transfer printing process and article. The process comprises the steps of beginning with a transfer sheet and depositing an elastomeric transparent thermoplastic first layer thereon. One or more layers of image-forming ink are deposited on the first layer by surface-to-surface printing methods. A last, adhesiver layer is deposited thereon. The intermediate article comprises this transfer lamination on the transfer sheet. Finally, the transfer lamination is transferred with the application of heat and pressure to attach the adhesive to a substrate and cure it in place. The heat permits removal of the transfer sheet.

Accordingly, it is an object of this invention to provide a transfer printing process by which an image can be transferred from a sheet to a substrate. It is another object to provide a transfer printing process by which an image can be applied to an elastic surface, such as a woven or knitted textile fabric. It is a further object to provide a transfer printing process by which an image formed by surface-to-surface printing methods can be transferred onto a textile material. It is another object to provide a transfer lamination mounted upon a transfer sheet which can be attached to an elastomeric substrate, such as a fabric. It is another object to utilize the speed, accuracy, and definition of standard high speed surface-to-surface printing processes to print images which can be subsequently transferred to other substrates. It is a further object to provide a transfer lamination by which an image can be transferred onto any one of a plurality of different substrates, such as textiles, apparel, apparel accessories, labels, leather, elastics and the like. It is another object to provide an image carrying transfer lamination which can be applied to an elastic or flexible material. It is a further object to economically and accurately apply a fine quality monochrome or multicolor image to an elastic or flexible material.

Still other objects, features, and attendant advantages of the present invention, together with modifications and equivalents, will become apparent to those skilled in the art from a reading of the following detailed description of the preferred embodiment, constructed in accordance therewith, taken in conjunction with the accompanying drawings wherein like numerals designate like parts in the several figures.

DESCRIPTION OF THE PREFERRED EMBODIMENTS

Figure 1:
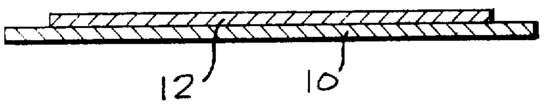
FIGS. 1 and 2 are sections through the preferred embodiment of the partially completed articles at the end of the respective first and second steps of the process.
Figure 2:
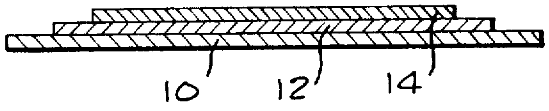

FIGS. 1 through 4 illustrate process steps in production of the intermediate article, the transfer lamination on its transfer sheet. Transfer sheet 10 can be a sheet of vegetable parchment, glassine, or similar material to serve as a support for the production of an image, and from which support the image can be released. These materials are useful for the purpose, but it has been found that when the transfer sheet is a larger dimension in order to accommodate larger images, the oven drying of subsequent layers causes dimensional changes in the transfer sheet. For large sizes, the transfer sheet must be of material which resists dimensional changes upon baking. Thus, the preferred transfer sheet material for use with larger dimensions is a ten-point Bristol board, which has a clay coat on both sids, covered on both sides with a thermosetting polymer composition material. A suitable material is a silicone thermosetting polymer composition material commonly used as a water-proofing applied to menus, paperback book covers, posters, and the like. Any convenient thermosetting plastic which provides moisture-proof characteristics to the transfer sheet and provides the surface characteristics necessary for the application of ink is suitable. Furthermore, a thermoplastic coating with a high enough softening temperature to not unduly soften during the processing is also acceptable. While the coated transfer sheet is preferred for economic reasons, it is equally clear that the transfer sheet totally of polymer composition material, either thermosetting or thermoplastic, of suitable characteristics is useful.

The first layer 12 is a layer which serves multiple purposes. First, it must act as a release coat for releasing the transfer lamination from the transfer sheet. Second, it should be a protective layer for the protection of the image in the transfer lamination after release. First layer 12 thus is a clear solid coat of thermal stretch ink applied by silk screen process. It is approximately 50 microns thick and is thereupon dried or thermally cured to set.

The thermal stretch ink is a commercially available silk screen textile ink. One of such commercial products is Naz-Dar PS-000 series Vinyl Plastisol, available from the Naz-Dar Company, 461 Milwaukee Avenue, Chicago, Ill., and another one is Stretch Ink series 6500A, available from Colonial Printing Ink Company, 180 E. Union Avenue, East Rutherford, N.J. Both of these products are believed to be principally polyvinyl chloride plastisols.

The vinyl plastisol is a dispersion of vinyl resin in a non-aqueous liquid which does not dissolve the resin at ordinary temperatures. When the liquid phase consists only of a plasticizer, such as dioctyl phthalate, the dispersion is termed a plastisol. In addition, pigments, fillers, stabilizers, and/or lubricants may be dispersed together with the resin in the plasticizer, as required for the particular application. Upon heating, adjacent resin particles are fused together by heat. Thus, the plastisol is converted to a tough, rubbery film by heating to about 350° for a polyvinyl chloride. The temperature is a function of the nature of the resin. To obtain maximum toughness, full fusing is required. Since fusing is accomplished by the temperature at the resin particles themselves, the time in the oven is dependent on the method of heating.

Organisols are formed by the vinyl dispersions in a polar compound which forms a strong attachment to the resin to aid in wetting and dispersing it. Plasticizers and volatile components such as esters, ketones and glycol ethers are typical dispersants. In addition, diluents make up the organisol and are usually aromatic or aliphatic hydrocarbons. Such diluents balance and modify the wetting and swelling characteristics of the dispersants and lower the viscosity of the ink. In the present case, reduction of viscosity from the viscosity of the commercial stretch ink is necessary to work well with silk screen application of the ink. When viscosity is lowered by increasing the plasticizer content, the resultant surface of the fused first layer 12 does not work well in accepting the process inks used in the following printing steps. Instead, a regular mineral spirit is used to reduce the viscosity of the stretch ink material as supplied. The preferred diluent is aliphatic naphtha from 10 to 12 carbons in the boiling range of 300° to 400° F. When employed, it provides a resultant surface after fusing which is free of platicizer and which can be readily printed upon. The amount of diluent added is in the approximate ratio of 70:30 of the original plastisol to the added mineral spirit diluent. Aromatic hydrocarbons as diluents are undesirable, because they reduce the elastomeric qualities of the finished fused film, and such reduction is contrary to the desired ultimate results. The use of an aliphatic diluent has little solvating and swelling effect on the vinyl chloride resins and such diluent produces a resulant organisol of low viscosity and high solids content suitable for use in silk screen application.

When the vinyl chloride polymer releases hydrogen chloride under the influence of the fusing heat, an acid condition is created. The acid condition may cause this film to yellow. Stabilization against this effect is accomplished by the addition of compounds which react with the hydrogen chloride to cause its neutralization. When the stretch ink material is pigmented, the lead compounds of pigmentation accomplish stabilization. However, when the first coat is clear, as is the first layer 12, stabilization is accomplished by organic phosphites. Thus, an adequate quantity of organic phosphite is added to maintain the layer clear.

Further information with respect to the details of the thermal stretch ink is found in "Plastics Engineering Handbook", 3rd edition, Van Nostrand Reinhold Company, New York, 1960, particularly at pages 223 through 285, and "Principles of Surface Coating Technology", by Dean H. Parker, Interscience Publishers, Division of John Wiley & Sons, Inc., New York, 1965, particularly at pages 301 through 313.

In order that the first layer 12 serves as a satisfactory base for the subsequent image-making processes, it is necessary to be partially or fully thermally cured.

This is accomplished in an infrared, microwave, or other conventional type of oven. The type of oven used, the thickness of the first layer 12, and the temperature determine the length of curing time. This varies from 15 seconds with a microwave oven to approximately 30 seconds with conventional heat. The preferred apparatus to accomplish this curing in a production system is a conveyor oven-curing device which an infrared heat source.

During curing of the organisol, the volatile aliphatic diluent is evaporated, and the resin particles are fused together. These two steps are actually combined and accomplished at the same time, because the increased solubility of the resin in the hot liquid aliphatic diluent aids in the fusion. The temperature of 300° F. to 350° F. is required to produce a film of maximum strength. The long baking at lower temperatures cannot be substituted for the required temperature, because the vinyl chloride resin does not soften for fusing until about 350° F.

As the next step in the process, image layer 14 is applied. The image layer 14 is applied by a conventional printing operation, which includes the application of halftone or color separations to first layer 12 by lithograhic offset or other standard surface-to-surface printing processes. The halftone or full color process utilizes either standard air-drying process inks or latex-based air-drying inks. The air-drying inks are used for speed and economy and provide ample adhesion to the first layer 12 of thermal stretch ink.

While good images are obtained at the time of printing by the use of standard inks, caution must be employed in ink selection so that they are compatible with the later thermal treatment. For example, standard yellow process ink has a tendency to spread during the thermal treatment, resulting in yellow dominance in a multi-color halftone image. Thus, heat resistant yellow inks are preferably employed under such circumstances. The particular heat resistant yellow ink preferred is manufactured by the Gans Ink Co., of Los Angeles, Calif., and is completely compatible with standard process red, blue, and black inks produced by the same firm. Drying speed improvement can be obtained by ink modification, usually by the inclusion of faster dryers therein, but care must be taken so that the resultant inks are compatible with each other, are compatible with the subsequent thermal processing, and produce sharp accurate images.

In order to reproduce the correct image and proper color after transfer is completed, it is necessary in multicolor printing to print the image in reverse and to reverse the normal sequence used in full color process printing. This is because the final image will be viewed through the first layer 12, rather than from the side from which it is applied. Complete printing freedom of choice is available for the application of the image of layer 14, and the full color process is described because full color work cannot presently be satisfactorily applied to stretchable textile materials. However, line work in single or multicolor, or monochrome halftone can be employed. Each ink layer in the image layer 14 has a conventional thickness of from 1 to 3 microns, as applied by standard surface-to-surface printing methods. The final layer 16 is another layer of thermal elastic stretch ink, which can be of the same material as layer 12. However, it is preferred that the layer 16 be pigmented to provide a proper background for the image layer 14. Usually, the proper background is white, especially when the transfer is to be applied to a white fabric. However, other colors of pigmentation are appropriate, especially when they are coordinated with the colors in the image layer 14 and the intended background fabric color. In the preferred embodiment, layer 16 is the adhesive layer which attaches the image to the fabric 20. The adhesive layer 16 is applied by silk screen process to approximately 50 microns thick and is dried. If required, additional coats of layer 16 can be applied, as necessary, to increase the opacity of the final thermal stretch ink layer 16. A thicker, more opaque layer 16 allows the transfer to be made onto a darker colored fabric, without the dark fabric color showing through the completed transfer.

Figure 4:
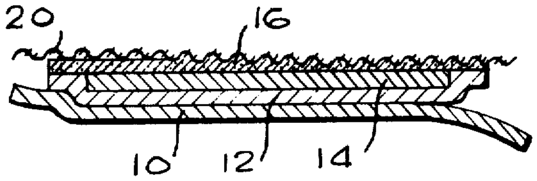
FIG. 4 shows the step of applying the intermediate article to a fabric substrate.
Figure 5:
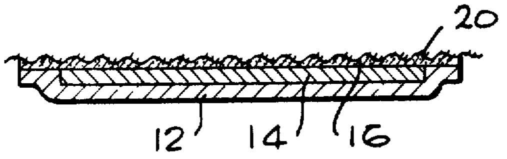
FIG. 5 shows the preferred embodiment of the finished article applied to a substrate.

As illustrated in FIG. 4, the intermediate article is engaged against a fabric layer 20, and heat and pressure are applied. The temperature at which the heat is applied, and the length of time during which the heat and pressure applied depend a great deal upon the fabric and the method of application of the heat. 400° F. and 50 pounds per square inch are appropriate values, although the pressure can vary from that value by 25 pounds per square inch, and the temperature is chosen in accordance with the ink characteristics. For the inks employed, plus or minus 50° F. from that temperature is satisfactory, although 400° is preferred. When the heat is applied through the fabric to the transfer, contact times in the order of 15 seconds are usual. However, when the heat is applied to the transfer, the time under pressure in the press can be managed in as little as about 4 seconds. In general, the time and temperature should be sufficient to effect a complete transfer without scorching the fabric 20 and without altering the transfer image. At the same time the adhesive layer 16 attaches to the fabric, the heat causes first layer 12 to become thermoplastic to permit removal of the transfer sheet 10, and effects an adhesive bond of layer 16 to the fabric which is cured by this heat. This bond is illustrated to the right of FIG. 4. After the transfer is completed, as illustrated in FIG. 5, the transfer lamination comprising layers 12 through 16 is thermally adhered to fabric 20 so that it is able to stretch and bend with normal fabric resiliency. The heat and time required to transfer the lamination onto the fabric layer 20 is usually not sufficient to complete the full cure of the adhesive layer 16, and the layer 12 if that has not previously been accomplished. Curing is thus completed in a conventional or infrared oven. Curing time and temperature vary, as required to complete fusion of the resin particles.

Figure 3:
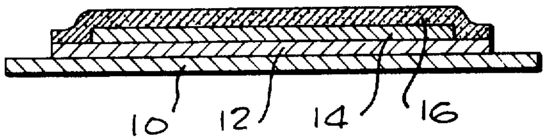
FIG. 3 is a section through the completed intermediate article in its preferred embodiment.
Figure 6:
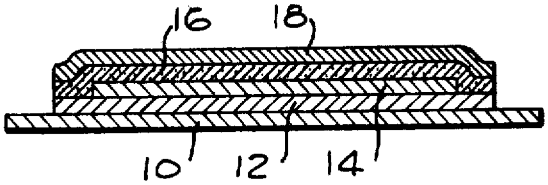
FIG. 6 is a section through the second embodiment of the completed intermediate article.
Figure 7:
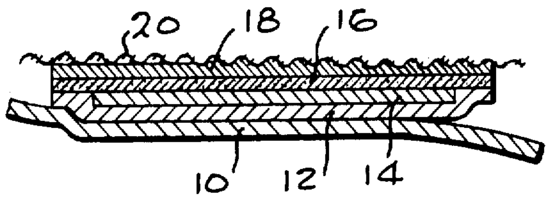
FIG. 7 shows the step of applying the second embodiment of the intermediate article to a fabric substrate.
Figure 8:
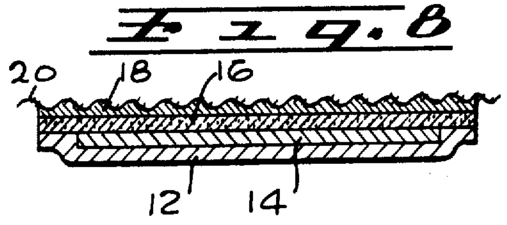
FIG. 8 shows the second embodiment of the finished article applied to a substrate.

Layer 16 is pigmented to serve as a background for the image layer 14. The presence of this particular layer prevents visibility of the fabric color layer 20 through the image layer to prevent observable color shift. The transfer lamination is thus a line, halftone, or full color printed image which has been laminated between two or more layers of thermal stretch ink or adhesive, with the first layer 12 clear for viewing the image, with the rear layer sufficiently adhesive to attach the transfer lamination. The preferred embodiment of the transfer lamination and its application to the fabric has been described above with respect to FIGS. 1 through 5. An additional embodiment of the transfer lamination is also possible wherein the structure of FIG. 3 is cured so that its layers 12 and 16 are fully set. In this way, layer 16 maintains its integrity to prevent fibers of the fabric from thrusting therethrough. On top of that structure is applied adhesive layer 18 (see FIG. 6) which is another layer of the same thermally settable stretch ink. It is applied by the silk screen method onto the image area, the same as protective layer 16. It is applied to a thickness of from 0.001 inch to 0.005 inch and, after application is air-dried, by driving off the diluent. Thus, it is uncured but the resin-plasticizer dispersion is of high enough viscosity to be substantially non-tacky. The transfer is then accomplished by application of the intermediate to fabric 20 (see FIG. 7) with the application of heat and pressure and stripping away of the transfer sheet to result in a finished product illustrated in FIG. 8. The considerations of heat and pressure and later additional curing of the adhesive layer 18 are the same as described with respect to the preferred embodiment. For other applications of the transfer, an adhesive layer 18 of other types of adhesives, such as silicon ribber cement, are feasible, depending upon the surface to which the transfer is to be applied.

This invention having been described in its preferred embodiment, it is clear that it is susceptible to numerous modifications and embodiments within the ability of those skilled in the art, and without the exercise of the inventive faculty. Accordingly, the scope of this invention is defined by the scope of the following claims.

What is claimed is:

1. A transfer lamination having transfer layers for the application of an image onto fabric substrate, said transfer layers consisting of:

a transparent first layer which forms a tough rubbery film which has a high degree of thermal stability and is resilient to yellowing;

at least one image-carrying layer printed on the back of said first layer by a surface-to-surface printing method; and an adhesive layer forming the back layer of said transfer lamination for adhesive attachment of said transfer lamination to a resilient substrate said adhesive layer forming a tough rubbery film which has a high degree of thermal stability and is resistent to yellowing.

2. The transfer lamination of claim 1 wherein said first layer and said adhesive layer are formed of heat resistant thermal elastic stretch ink.

3. The transfer lamination of claim 2 wherein said adhesive layer is pigmented to be opaque.

4. The transfer lamination of claim 3 wherein said adhesive is adhesively secured to a fabric substrate.

5. The transfer lamination of claim 4 wherein said adhesive layer is a thermally cured adhesive and is thermally bonded to said fabric substrate.

6. The transfer lamination of claim 1 further consisting of:

a transfer sheet to which said first layer is secured for the support of said first layer during the application of said image layer, and said adhesive layer, for handling said transfer lamination.

7. The transfer lamination of claim 6 wherein said first layer and said adhesive layer are formed of heat resistant thermal elastic stretch ink.

8. The transfer lamination of claim 7 wherein said adhesive layer is pigmented to be opaque.

9. In a process for producing a transfer lamination employed to apply an image to a flexible substrate which comprises the steps of forming a first transparent layer, printing an image layer onto the first layer, applying an adhesive layer to the image layer so that the three layers form a transfer lamination which can be adhesively applied to a flexible substrate, and drying and curing said layers, the improvement wherein:

the first transparent layer is formed on a transfer sheet by applying a layer of transparent polyvinyl chloride plastisol heat resistant thermal elastic stretch ink to a release surface of the transfer sheet and partially curing said layer by infrared heating; the image layer is formed on the first layer so as to be visible through the first layer by lithographically printing heat resistant ink which is compatible with the first layer on to said first layer; and the adhesive layer is formed by applying a polyvinyl chloride plastisol heat resistant thermal elastic stretch ink over the first layer and the image layer; said layers being partially cured such that the first layer and adhesive layers are not tacky at room temperature.

* * * * *